(12) United States Patent
Covington et al.

(10) Patent No.: US 9,165,574 B2
(45) Date of Patent: Oct. 20, 2015

(54) MAGNETIC ELEMENT WITH DUAL MAGNETIC MOMENTS

(71) Applicant: Seagate Technology LLC, Scotts Valley, CA (US)

(72) Inventors: Mark William Covington, Edina, MN (US); Qing He, Plymouth, MN (US); Thomas Roy Boonstra, Chaska, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 61 days.

(21) Appl. No.: 13/760,286

(22) Filed: Feb. 6, 2013

(65) Prior Publication Data

US 2013/0149559 A1    Jun. 13, 2013

Related U.S. Application Data

(63) Continuation of application No. 13/093,510, filed on Apr. 25, 2011, now Pat. No. 8,400,738.

(51) Int. Cl.
| | |
|---|---|
| *G11B 5/39* | (2006.01) |
| *H01L 43/08* | (2006.01) |
| *G11B 5/33* | (2006.01) |
| *B82Y 10/00* | (2011.01) |
| *B82Y 25/00* | (2011.01) |

(52) U.S. Cl.
CPC . *G11B 5/33* (2013.01); *B82Y 10/00* (2013.01); *B82Y 25/00* (2013.01); *G11B 5/3909* (2013.01); *G11B 5/3912* (2013.01); *G11B 2005/3996* (2013.01); *Y10T 428/11* (2015.01); *Y10T 428/115* (2015.01); *Y10T 428/1121* (2015.01); *Y10T 428/1143* (2015.01); *Y10T 428/1193* (2015.01)

(58) Field of Classification Search
None
See application file for complete search history.

(56) References Cited

U.S. PATENT DOCUMENTS

| | | | |
|---|---|---|---|
| 6,111,730 | A | 8/2000 | Fernandez-de-Castro |
| 7,035,062 | B1 | 4/2006 | Mao et al. |
| 7,333,304 | B2 | 2/2008 | Gill et al. |
| 7,616,411 | B2 | 11/2009 | Gill |
| 7,688,545 | B1 | 3/2010 | Vas'ko et al. |
| 8,149,548 | B2 | 4/2012 | Hatatani et al. |
| 8,400,738 | B2 * | 3/2013 | Covington et al. ...... 360/324.12 |
| 8,842,396 | B1 * | 9/2014 | Zhu ........................ 360/324.12 |
| 9,001,474 | B2 * | 4/2015 | Covington et al. ...... 360/324.12 |
| 2002/0114111 | A1 | 8/2002 | Zhu |
| 2003/0123198 | A1 | 7/2003 | Sugawara et al. |
| 2004/0047089 | A1 | 3/2004 | Singleton et al. |
| 2004/0066574 | A1 | 4/2004 | Crue et al. |
| 2005/0105223 | A1 | 5/2005 | Larson et al. |

(Continued)

FOREIGN PATENT DOCUMENTS

| | | |
|---|---|---|
| JP | 2008-299890 A | 12/2008 |
| WO | 2005/006450 A1 | 1/2005 |

*Primary Examiner* — Kevin Bernatz
(74) *Attorney, Agent, or Firm* — Hall Estill Attorneys at Law

(57) ABSTRACT

An apparatus and associated method may be used to provide a data sensing element capable of detecting changes in magnetic states. Various embodiments of the present invention are generally directed to a magnetically responsive lamination of layers and means for generating a high magnetic moment region proximal to an air bearing surface (ABS) and a low magnetic moment region proximal to a hard magnet.

20 Claims, 7 Drawing Sheets

(56) References Cited

U.S. PATENT DOCUMENTS

| | | |
|---|---|---|
| 2007/0242394 A1 | 10/2007 | Gill |
| 2009/0080125 A1 | 3/2009 | Kondo |
| 2009/0257154 A1 | 10/2009 | Carey et al. |
| 2009/0262465 A1 | 10/2009 | Hatatani et al. |
| 2010/0187198 A1 | 7/2010 | Gill |
| 2012/0134057 A1 | 5/2012 | Song et al. |

* cited by examiner

MAGNETIC ELEMENT WITH DUAL MAGNETIC MOMENTS

RELATED APPLICATION

This application is a continuation of copending U.S. patent application Ser. No. 13/093,510 filed on Apr. 25, 2011.

SUMMARY

Various embodiments of the present invention are generally directed to a data sensing element capable of detecting changes in magnetic states.

In accordance with various embodiments, a magnetically responsive lamination of layers is provided with means for generating a high magnetic moment region proximal to an air bearing surface (ABS) and a low magnetic moment region proximal to a hard magnet.

DETAILED DESCRIPTION

A data sensing element that can be capable of detecting magnetic fluctuations is generally disclosed herein. Electronics devices are becoming more sophisticated and demand for higher data capacity as well as improved data transfer rates have placed added emphasis on the speed and reliability of data sensing elements. With a large segment of data storage being conducted through the use of magnetic storage, magnetic stabilization of the data sensing elements that are sensitive to changes in magnetic fluctuations plays an ever important role.

A magnetic sensing element with dual magnetically free layers and an increased stripe height, as measured from an air bearing surface (ABS), can have enhanced performance and stability characteristics for ever increasing high linear bit density applications. However, the increased stripe height of a tri-layer element can suffer from magnetic instability in situations where neighboring ferromagnetic free layers switch into an unwanted magnetic configurations.

To improve the magnetic stability of such a magnetic sensing element that utilizes a hard biasing magnet, a low magnetic moment region can be oriented near the hard magnet while a high magnetic moment region is created near the ABS. The coexistence of dual magnetic moment regions may generate predetermined magnetostatic interactions and promote orthogonal magnetic biasing near the ABS that enhances the performance and parallel magnetizations near the permanent magnetic (or hard bias). Thus, creating multiple magnetic moment regions in a data sensing element can achieve a balance between magnetic stability and field biasing that improves data sensing in view of increasing linear bit densities.

Figure 1:
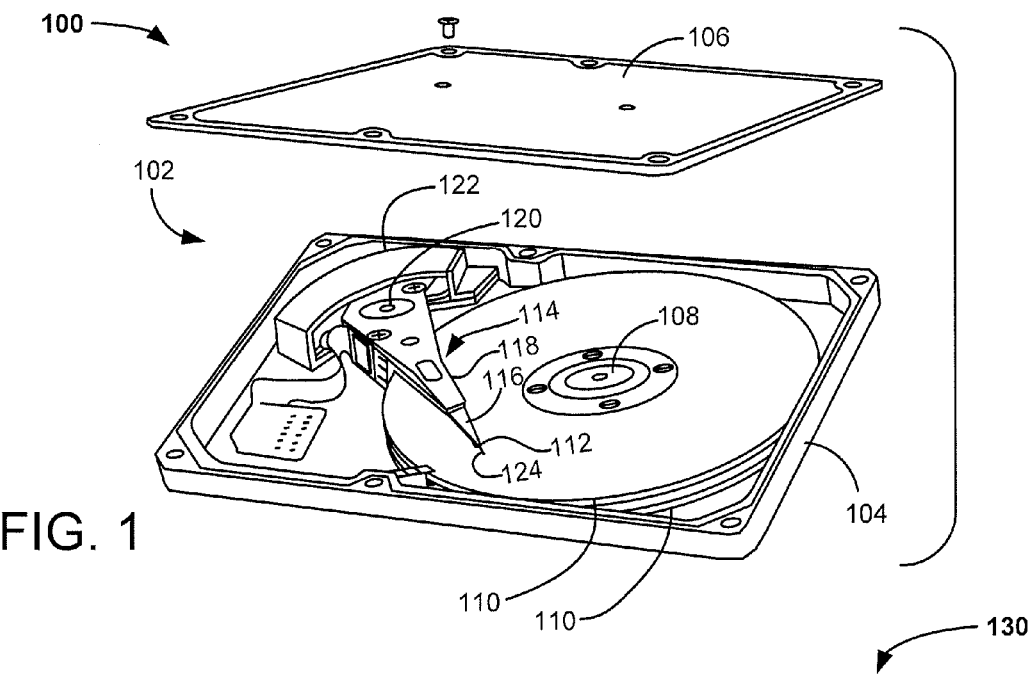
FIG. 1 is a perspective view of an embodiment of a data storage device.

An embodiment of a data storage device 100 is provided in FIG. 1. The device 100 shows a non-limiting environment in which various embodiments of the present invention can be practiced. The device 100 includes a substantially sealed housing 102 formed from a base deck 104 and top cover 106. An internally disposed spindle motor 108 is configured to rotate a number of magnetic storage media 110. The media 110 are accessed by a corresponding array of data transducers (read/write heads) that are each supported by a head gimbal assembly (HGA) 112.

Each HGA 112 can be supported by a head-stack assembly 114 ("actuator") that includes a flexible suspension 116, which in turn is supported by a rigid actuator arm 118. The actuator 114 may pivot about a cartridge bearing assembly 120 through application of current to a voice coil motor (VCM) 122. In this way, controlled operation of the VCM 122 causes the transducers 124 of the HGA 112 to align with tracks (not shown) defined on the media surfaces to store data thereto or retrieve data therefrom. An ability to decrease the width of the tracks while maintaining proper alignment of the transducers 124 can be accomplished by decreasing the operational width of at least one transducing magnetic element. Thus, the device 100 can have increased capacity through the incorporation of transducing elements with reduced operational width which corresponds to a finer areal resolution.

Figure 2:
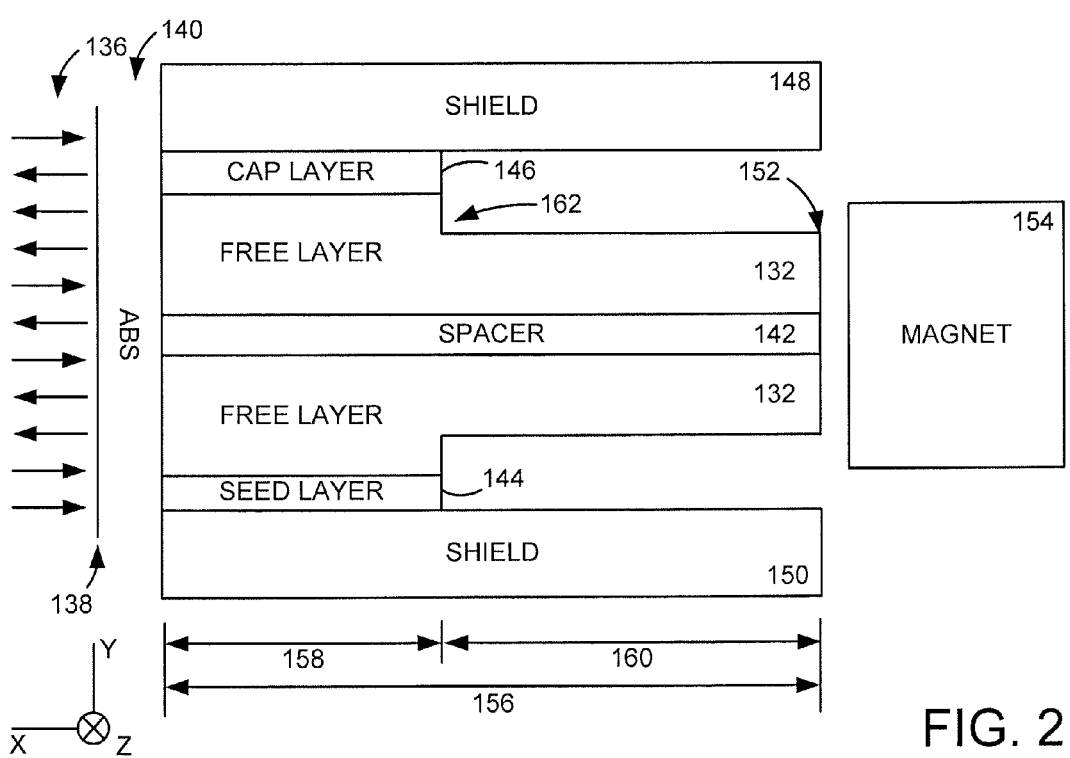
FIG. 2 generally illustrates an example of a magnetic element capable of being used in the data storage device of FIG. 1.

FIG. 2 displays a cross-section view of block representation of an embodiment of a magnetic element 130 capable of being used in the device 100 of FIG. 1. The element 130 has first and second ferromagnetic free layers 132 and 134 that are each sensitive to external magnetic fields. That is, each free layer 132 and 134 can have independent (anti-parallel) or common (parallel) magnetizations that correspond to an encountered external magnetic field, such as programmed magnetic bits 136 on a data storage media 138 separated from the free layers 132 and 134 by an ABS 140.

The free layers 132 and 134 are each contactingly adjacent a non-magnetic spacer layer 142 that acts to provide a measurable magnetoresistive effect between layers 132 and 134. While the spacer 142 can be constructed in a variety of different non-limiting configurations, the non-magnetic material and thickness can be constructed to accommodate varying free layer magnetic interactions and bit 136 sensing. Each of the free layers 132 and 134 can additionally be coupled to a respective electrode layer, such as seed layer 144 and cap layer 146 that aid in the manufacturing of the magnetic element 130. It is contemplated, however, that the magnetic element 130 is constructed without the electrode layers while in other embodiments the composition, shape, and placement of the electrode layers 144 and 146 are modified, for performance and manufacturing benefits.

The magnetic element 130 is further constructed with at least one shield layer attached to each of the electrode layers 144 and 146 on opposite sides of the free layers 132 and 134. The shield layers 148 and 150 can be oriented in a variety of formations and compositions to direct unwanted magnetic flux away from the free layers 132 and 134. Such shielding can allow for improved magnetic sensing of programmed bits 136 from preset tracks in the media 138 by eliminating noise and inadvertent sensing of adjacent bits. The distance between the shield layers 148 and 150, also known as shield-to-shield spacing, is inversely proportional to the downtrack magnetic resolution, which corresponds with increased storage capacity for the media 138.

The free layers 132 and 134 in combination with the spacer 142 can be characterized as a magnetic sensing stack 152 that is influenced with a bias magnetic force from a permanent (hard) magnet 154 positioned laterally adjacent the magnetic stack 152 opposite the ABS 140. The magnetic stack 152 can further be configured with an elongated stripe height 156 that corresponds with robustness against process variability and external disturbances. Such elongated stripe height combines with the biased magnetization to increase performance through improved magnetic sensing of external bits, such as bits 136.

However, the improved robustness against process variability can be associated with introducing undesirable magnetic instability due to magnetostatic interactions near the permanent magnet 154 that favor an anti-parallel magnetic alignment which degrades the bias force implied to the free layers 132 and 134. That is, the permanent magnet 154 is designed to induce a magnetic force on each of the free layers 132 and 134 and that force is affected by interactions between the free layers 132 and 134 that result from the elongated stripe height 156.

Accordingly, various embodiments of the present invention create a high magnetic moment region 158 near the ABS 140 and a low magnetic moment region 160 near the permanent magnet 154. The lower magnetic moment proximal to the permanent magnet 154 induces smaller magnetostatic coupling and higher flux density of the generated bias field while the higher magnetic moment proximal to the ABS 140 leads to larger magnetostatic interactions and a promotion of orthogonal bias between the free layers 132 and 134, thus enhancing the element's 130 reading sensitivity and performance.

The creation of the dual independent magnetic moments in the stack 152 can be done in a variety of manners, none of which are limited or required. However, in the embodiment shown in FIG. 2, the thickness, as measured along the Y axis, of each free layer 132 and 134 is reduced along a predetermined length of the stripe height 156 near the permanent magnet 154. The reduction in thickness combines with the saturation magnetization of the material of each free layer 132 and 134 to generate a predetermined magnetic moment. Hence, the magnetic moment for a region of the free layers 132 and 134 is a product of the saturation magnetization of the material and the thickness.

For clarity, the "magnetic moment" of the free layers 132 and 134 is herein meant to correspond with a tendency to align with a magnetic field. As such, the higher magnetic moment near the ABS 140 promotes a heightened reluctance to encountered magnetic fields while the lowered magnetic moment near the magnet 154 allows the rear portion of the stack 152 to easily align with the bias field generated from the permanent magnet 154, which reduces the propensity for the back part of the free layers 132 and 134 to align anti-parallel, as discussed above, and enhances stability of the element 130. While the portion of the stack 152 that is directly adjacent the read bits 136 has an increased magnetic moment, the larger moment is relative to the moment of the rear portion of the stack 152 and does not adversely affect the operation of the element 130 due to the balance between the biasing field at the rear and the orthogonal magnetizations at the ABS.

The magnetic moment regions 158 and 160 in the stack 152 can further be respectively tuned by adjusting the magnetic anisotropy. In one such embodiment, the amplitude and direction of the magnetic anisotropy of the low moment region can be tailored via thin film and wafer processing to produce parallel anisotropy near the permanent magnet 154. In another embodiment, the anisotropy of the high moment region 158 is set to produce orthogonal anisotropic axis between the free layers 132 and 134, thus promoting a fast and reliable sensing of the external bits 136.

As an alternative to the stack 152 displayed in FIG. 2, a magnetic stack can be tuned with free layers that are continuous, but with one free layer having a reduced thickness section that defines high and low magnetic moment regions, respectively. That is, one of the free layers 132 or 134 can have a reduced thickness near the rear magnet 154 to generate a low magnetic moment region and a high magnetic moment region near the ABS 140.

It should be noted that the reduction in thickness of the free layers 132 and 134 transitions through a notch 162 in FIG. 2, but the notch is merely an example of a thickness transition and is not limiting to any possible reductions in thickness. For example, the thickness may be reduced by a gradual tapering or curvilinear transition that can be different sizes or shapes for each free layer 132 and 134 respectively.

Figure 3:
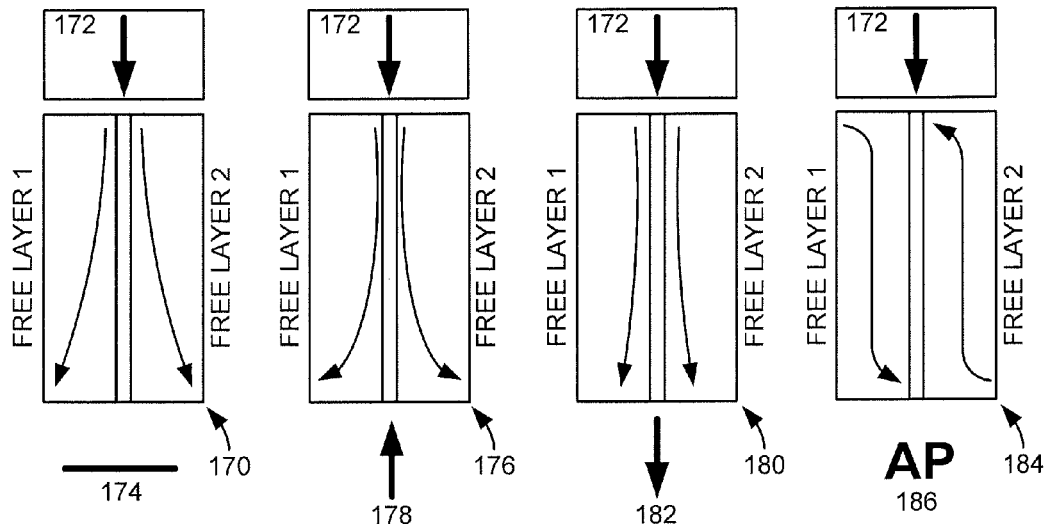
FIG. 3 displays operational characteristics of the magnetic element of FIG. 2.

In operation, the dual free layer configuration of the magnetic stack 152 provides beneficial magnetic data sensing. However, various inadvertent stability issues, as previously discussed, can inhibit the element 130 from reliably reading ever smaller data bits. FIG. 3 generally illustrates examples of stable and unstable operation of a number of magnetic stacks in response to a variety of external magnetizations with the use of a rearward hard magnet and without the use of independent magnetic moment regions. Stack 170 displays the first and second free layers with a default magnetic orientation set by the bias magnetization from the hard magnet 172. The magnetically neutral external field 174 does not influence the default magnetization of the stack 170 as the magnetizations of each free layer cant towards the corners in order to minimize the magnetostatic interaction energy.

When the free layers encounter an external magnetization in a first upward direction, as shown by stack 176 and magnetization 178, the magnetization of the free layers further cant towards the corners in a manner that is proportional to the strength of the field produced by the external magnetization and through the use of thresholds and encoding schemes can be sensed to correspond to a logical state, such as 0 or 1. The respective strengths of the different biases applied to the free layers can also be designed to cause the device to operate in a digital mode flipping between two discrete states in the presence of external fields such as those produced by a storage medium. It should be noted that the distance between the free layers can further affect the magnetization characteristics of the stacks and so the operations shown in FIG. 3 are not required or limited.

In magnetic stack 180, an external magnetization 182 of a second downward direction and above the default magnetization of the magnet 172 affects the magnetization of the free layers. The free layer magnetizations decrease the cant towards the corners and become more parallel as the external magnetization 182 matches the direction of the bias field from the magnet 172. As with the free layer magnetizations of stack 176, the affect of external magnetization 182 can be sensed and differentiated from the default magnetization of stack 172 to read a logical state.

While operation of the dual free layer stacks 170, 176, and 180 can be sensed by a variety of different manners, such as, but not limited to, tunneling magneto resistive (TMR) and giant magnetoresistive (GMR) effects depending on the configuration of the spacer layer between the free layers, magnetic instability can occur when one of the free layers inadvertently switches magnetization direction, as shown in stack 184. Such a switch in magnetization can be referred to as an AP state 186 in which high resistance and very small output response makes it unsuitable to read external data bits.

A switch to an AP state 186 can occur in response to various characteristics like heat and relatively strong external fields and can result in catastrophic failure of a data transducing head. As such, the coexistence of a high and low magnetic moment region, as displayed of FIG. 2, can provide tuned magnetic field sensitivity through a relative magnetic moment differential that allows improved utilization of the bias field from the rear hard magnet and enhanced stabilization of the free layers.

Figure 4:
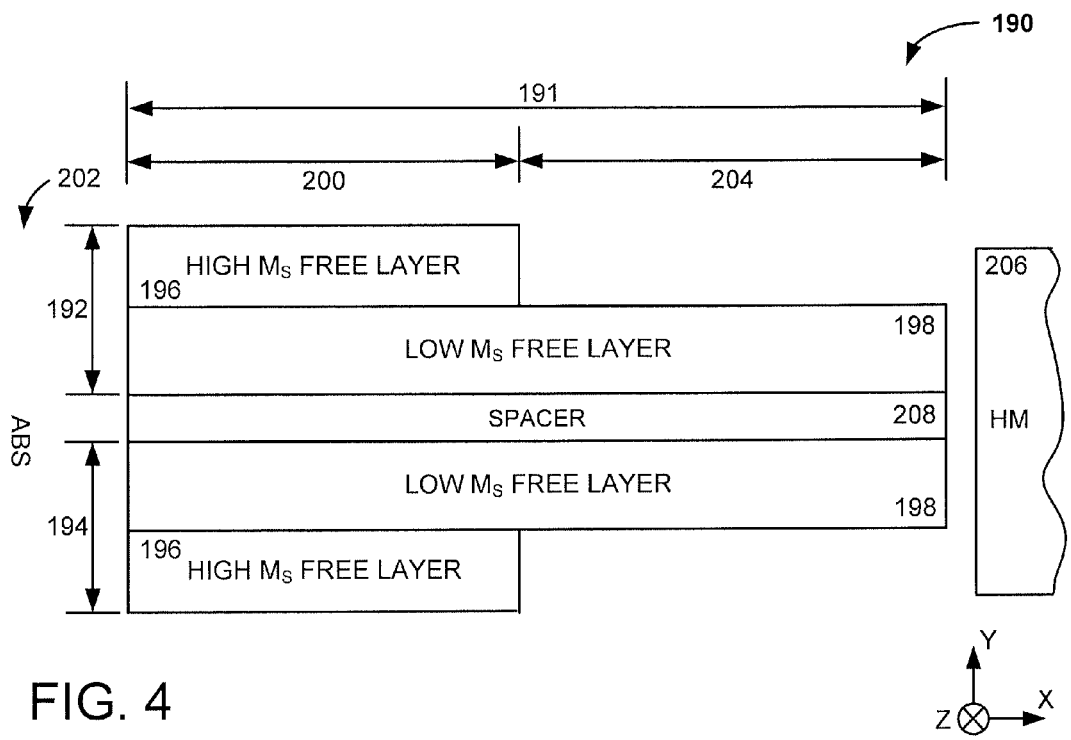
FIG. 4 shows a portion of the magnetic element of FIG. 2 as constructed and operated in accordance with various embodiments of the present invention.

FIG. 4 illustrates a magnetic stack 190 that can be used in various embodiments to induce dual magnetic moment regions along its stripe height 191, as measured along the X axis. A first and second free layer 192 and 194 can each be a lamination of a high saturation magnetization ($M_S$) material 196 and a low saturation magnetization material 198. As shown, the magnetic stack 190 has a non-magnetic spacer layer 208 disposed between the free layer laminations 192 and 194 that can be configured to provide data sensing from the stack 190.

The high $M_S$ layers 196 each interact with the low $M_S$ layers 198 through exchange coupling to produce a high magnetic moment region 200 proximal to the ABS 202. Meanwhile, the low $M_S$ layers 196 have a low magnetic moment region 204 near the rear mounted hard magnet (HM) 206 due to the lack of the high $M_S$ layer extending proximal to the hard magnet 206. It should be noted that the use of high and low $M_S$ materials is not limited to particular elements, alloys, and compounds, but certain ferromagnetic materials that exhibit predetermined saturation levels are used in various embodiments. It should be further noted that the saturation magnetization of a material is herein meant to encompass the state in which a material's magnetization cannot be increased by a significant amount.

Figure 5:
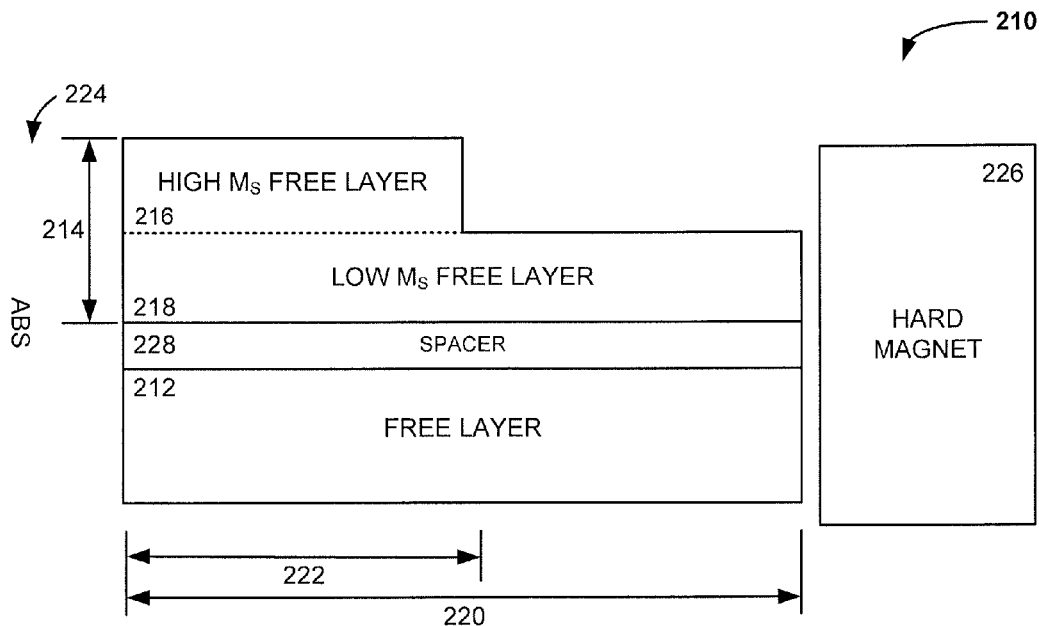
FIG. 5 shows a magnetic stack portion of a magnetic element constructed and operated in accordance with various embodiments of the present invention.

While the high $M_S$ layer 196 can be attached to each low $M_S$ layer 198, as depicted in FIG. 4, either free layer 192 or 194 can be configured with or without a high $M_S$ layer and with magnetic moment regions of different sizes. FIG. 5 provides an example of a magnetic stack 210 that illustrates such a configuration where a first free layer 212 is not constructed as a lamination of layers, but instead of a single continuous layer while the second free layer 214 can be either a single continuous layer or a laminated structure, as displayed by the segmented seam. The free layer 214 has high and low $M_S$ sub-layers 216 and 218, of which the low $M_S$ sub-layer shares a common long stripe height 220 with the non-laminated free layer 212 while the high $M_S$ sub-layer 216 has a different shorter stripe height 222.

The decreased thickness of one of the two free layers 212 and 214 is enough to provide a magnetic moment differential between the front of the stack 210, near the ABS 224, and the back of the stack 210, near the hard magnet 226. The stack configuration of FIG. 5 produces magnetic interactions between the free layers 212 and 214 across the non-magnetic spacer 228 that are stabilized by the decreased thickness of the laminated free layer 214 and the creation of a high magnetic moment region through the exchange coupling between the high and low $M_S$ layers 216 and 218.

Figure 6:
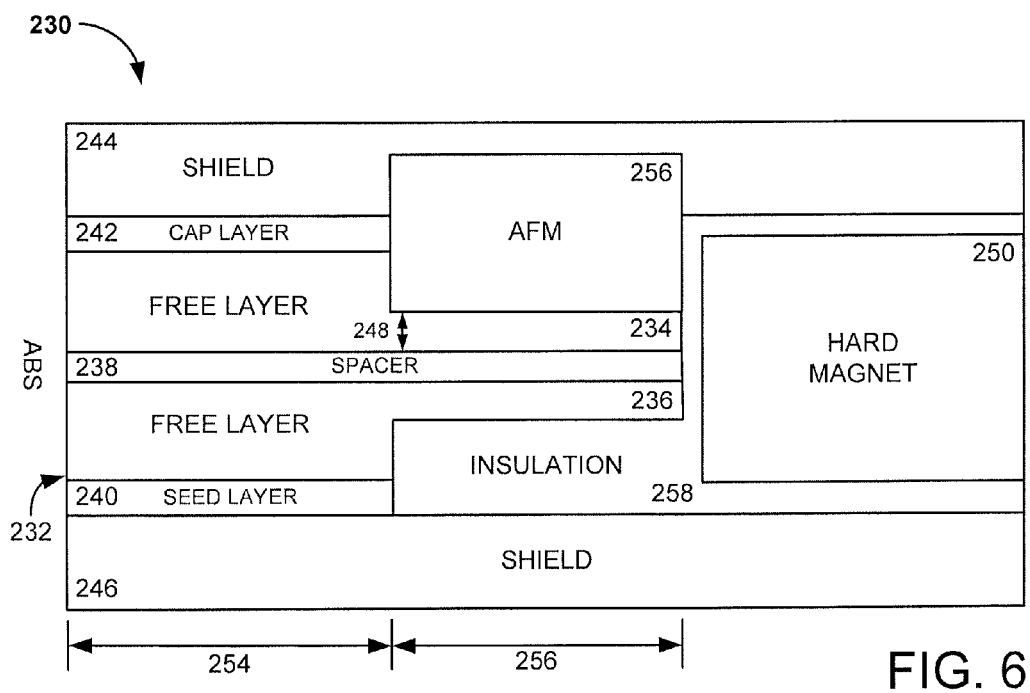
FIG. 6 provides an example of a magnetic element constructed and operated in accordance with various embodiments of the present invention.

A magnetic element that employs any of the respective stacks 152, 190, and 210 of FIGS. 2, 4, and 5 can generate independent high and low magnetic moment regions through varying configurations. FIG. 6 provides yet another example of a magnetic element 230 that can produce dual magnetic moment regions. A magnetic stack 232 has ferromagnetic free layers 234 and 236 separated by a non-magnetic spacer layer 238 and each attached to a seed or cap layer 240 or 242 and a shielding layer 244 or 246, respectively. The free layers 234 and 236 each have a section of reduced thickness 248 near the rear mounted hard magnet 250 to produce a low magnetic moment region 252, as opposed to the thicker portions of the free layers 234 and 236 that forms a high magnetic moment region 254.

While the reduced thickness sections of the free layers 234 and 236 can provide beneficial dual magnetic moment regions, as discussed in relation to FIG. 2, an antiferromagnet (AFM) 256 can be attached to some or all of the reduced thickness portion of either of the free layers 234 and 236. The connection of the AFM 256 to the low magnetic moment region 252 produces increased exchange coupling which further increases the effectiveness of the hard magnet 250 by maintaining the parallel magnetization of the biasing fields in the free layers 234 and 236.

The attachment of the AFM 256 to a single free layer is not limited, as an AFM could be coupled to the low magnetic regions of both free layers 234 and 236. The size, shape, and dimensions of the AFM 256 are also not limited. In the embodiment of FIG. 6, the AFM 256 extends into an area of reduced thickness in the shielding layer 244 to provide a sufficient exchange coupling for the free layer 234 while not increasing the shield-to-shield spacing of the element 230. In lieu of an AFM 256 attached to the free layers 234 and 236, a non-magnetic insulating material 258 can be positioned between the hard magnet 250 and the magnetic stack 232, which can aid in preventing inadvertent electrical shorting and unwanted conduction of the permanent magnet field into the shields.

Figure 7A:
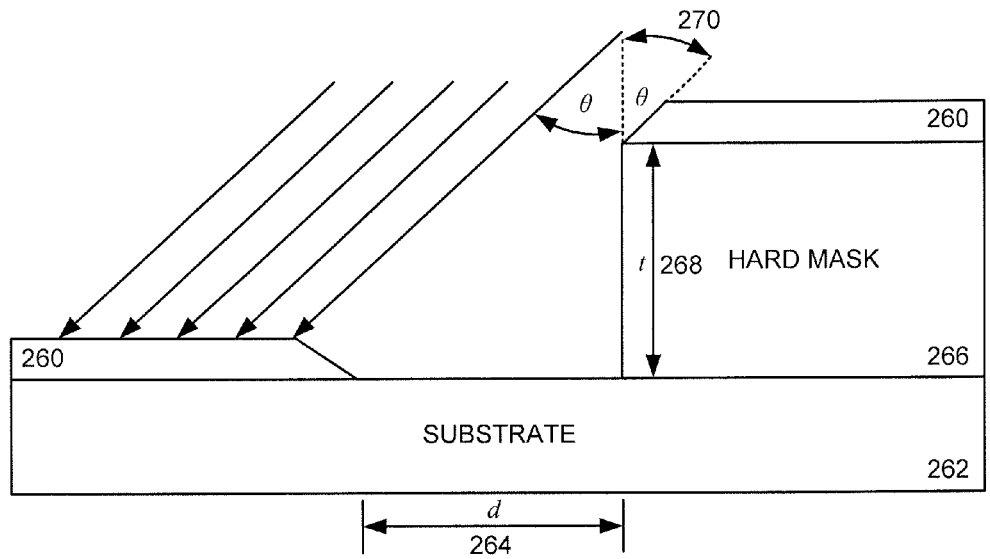
FIGS. 7A and 7B show various views of a fabrication technique operated in accordance with various embodiments to construct a magnetic element.

FIGS. 7A-11 each provides examples of element fabrication techniques conducted in accordance with various embodiments of the present invention. FIG. 7A displays a directional deposition in which some or all of the layers of a magnetic element can be created from an oblique angle. The directional deposition allows a layer 260 to be positioned on a substrate 262 a predetermined "shadowed" distance (d) 264 from a hard mask 266. The height (t) 268 of the hard mask 266 and the deposition angle (θ) 270 of the deposited layer 260 material provides the shadow distance 264 in which the layer is offset from the hard mask 266 according to equation 1.

$$d = t * \tan \theta \qquad \text{[Equation 1]}$$

Figure 7B:
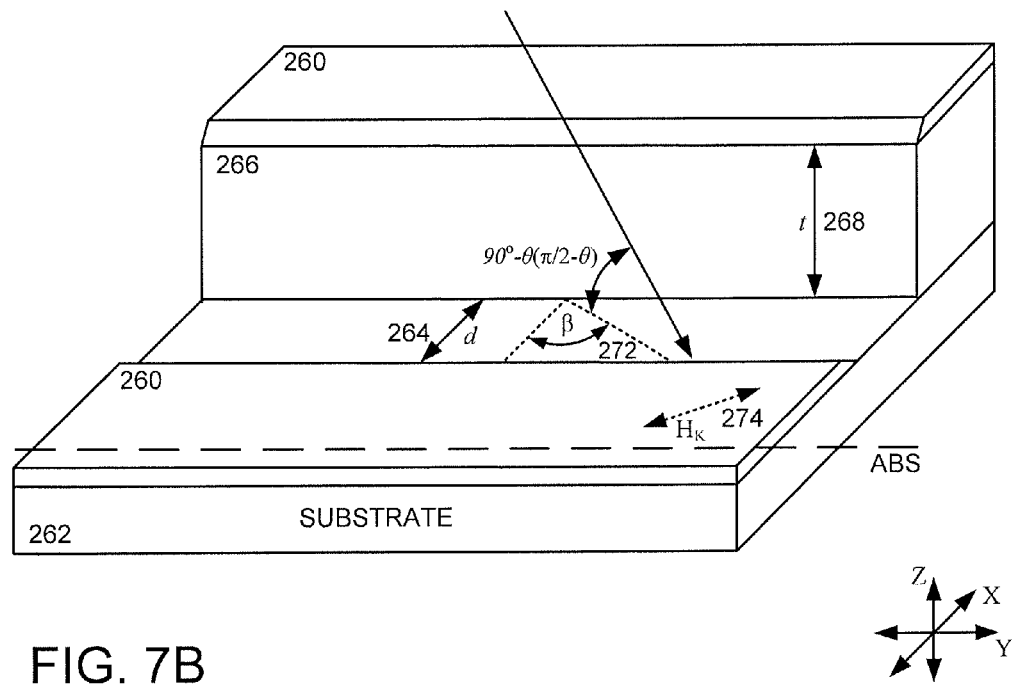

FIG. 7B illustrates an isometric view of the directional deposition displayed in FIG. 7A. The deposition angle θ 270 acts to offset the material from the hard mask 266 and to control the strength (or amplitude) of the magnetic anisotropy. The oblique angle (β) 272 controls the direction of the anisotropy axis within the wafer plane. One exception to this is that the anisotropy axis is orthogonal to the incident flux of material for large angles (e.g. greater than roughly 50°) and parallel for small angles (less than approximately 50°). As such, directional deposition can be utilized during layer manufacturing to control anisotropy ($H_K$) while offsetting the layer 260 the shadow distance 264 from the hard mask 266 according to equation 2.

$$d = t*(\tan\theta * \cos\beta)$$ [Equation 2]

Manipulating the anisotropy axis 274 of the layer 260, which orients orthogonally to the angle of deposition, can provide enhanced magnetic element stability and performance, as discussed above. The ability to adjust the angle of deposition along three axis (X, Y, and Z) allows the precise manufacturing of each layer of a magnetic element with predetermined size, shape, and anisotropy.

Figure 8:
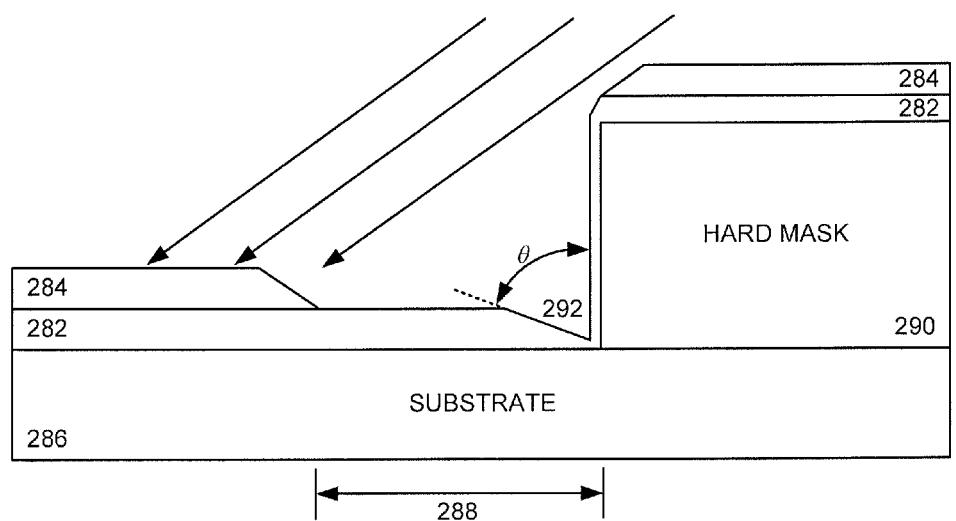
FIG. 8 shows a fabrication technique used to create a magnetic element in accordance with various embodiments of the present invention.

As previously described, layers of a magnetic element may be constructed with varying thicknesses and overlapping dimensions. FIG. 8 illustrates examples of in-situ construction of a magnetic element where a first and second stack layer 282 and 284, such as ferromagnetic layers having different saturation magnetizations discussed in relation to FIG. 4, have been sequentially deposited on a substrate 286 with each layer having a predetermined offset distance 288 from the hard mask 290. That is, the first stack layer 282 is deposited at a predetermined angle that covers the hard mask 290 and the substrate 286 to form a zero offset from the hard mask while the second stack layer 284 is deposited at a different angle, as shown in FIG. 8, in which the hard mask 290 prevents material from accumulating along the predetermined offset distance 288.

It can be appreciated that deposition mechanisms such as physical vapor deposition (PVD), ion beam deposition (IBD), evaporation, and chemical vapor deposition (CVD) can be used without limitation either individually or in combination to form the stack layers. During the deposition of the material using the various mechanisms displayed in FIG. 8, an inherent shadowing at the corner of the hard mask 290 and substrate 286 can result in an angular depression 292.

Figure 9:
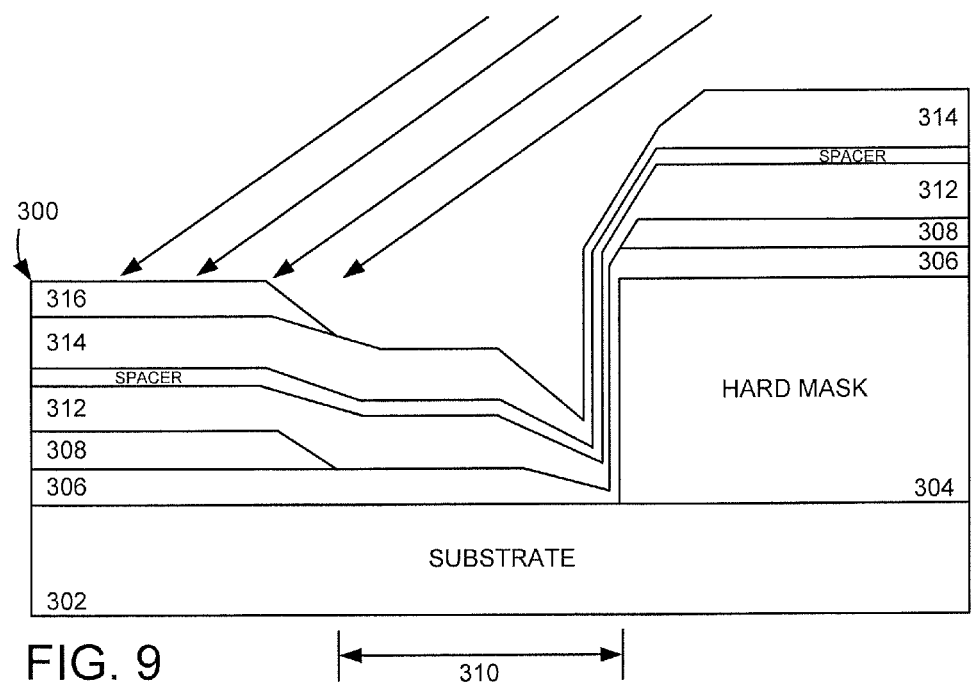
FIG. 9 shows a fabrication technique used to create a magnetic element in accordance with various embodiments of the present invention.

FIG. 9 generally displays a continuation of FIG. 8 where a magnetic stack 300 is formed by depositing a variety of materials onto a substrate 302 in varying thicknesses and offset distances from a hard mask 304. While any of the magnetic stacks described in this disclosure can be deposited through this oblique deposition, FIG. 9 depicts a laminated free layer magnetic stack, similar to the stack 190 of FIG. 4. Initially, a seed layer 308 is deposited with little or no offset from the hard mask 304. In other words, the seed layer 306 extends along the exposed length of the substrate to contact the hard mask 304.

A first ferromagnetic stack layer 308 is then deposited with a predetermined thickness that may or may not match the thickness of the seed layer 306. The first stack layer 308 is deposited at an oblique angle in which the hard mask 304 and seed material atop the mask 304 will shield the deposition of the ferromagnetic material anywhere in the predetermined offset distance 310. Next, a second ferromagnetic stack layer 312 covers the first stack layer 308 with little or no offset distance from the hard mask 304. As can be appreciated, such varying offset distances correspond with various oblique deposition angles, none of which are limited or required.

With the second stack layer 312 deposited with a predetermined thickness, a non-magnetic spacer material, such as MgO, is applied to cover the second stack layer 312. The deposition of the first and second stack layers 308 and 312 is then reversed in the deposition of the third and fourth ferromagnetic layers 314 and 316, the fourth layer 316 having the same offset distance 310 as the first stack layer 308. As shown, the practical oblique deposition of multiple layers onto a substrate 302 can provide numerous possible adjustments and variations that can precisely construct a magnetic stack 300 with coexistent high and low magnetic moment regions.

Figure 10:
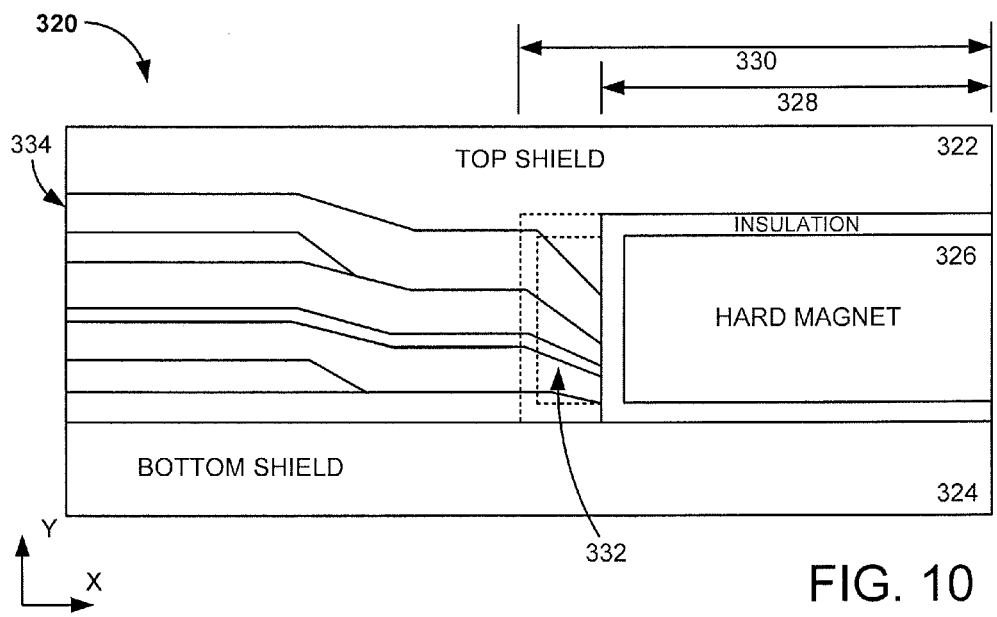
FIG. 10 shows an embodiment of a magnetic element constructed from the fabrication techniques of FIGS. 7A-9.

Such a magnetic stack can be formed into a magnetic element 320 by initially or subsequently installing the stack between a top and bottom shield 322 and 324, as generally illustrated in FIG. 10. The formation or installation of the magnetic stack between the shields 322 and 324 can be accompanied by the creation of a hard magnet 326 that may or may not be surrounded by an insulating material. The stripe height of the hard magnet 326, as measured along the X axis, can vary depending, as displayed by alternative stripe heights 328 and 330, on the inclusion of the tapered rear portion 332 of the magnetic stack 334. The tapered portion 332 can enhance magnetic stability, but can be eliminated by the hard magnet 326, as displayed by the segmented extension, to provide stronger bias fields.

Notice should be given to the fact that implementation of a magnetic stack, such as stack 300 of FIG. 9, into the magnetic element 320 may correspond with the removal of excess material and the hard mask. Such removal can be accomplished in a variety of ways, such as lapping and etching, neither of which are required or limited.

Figure 11:
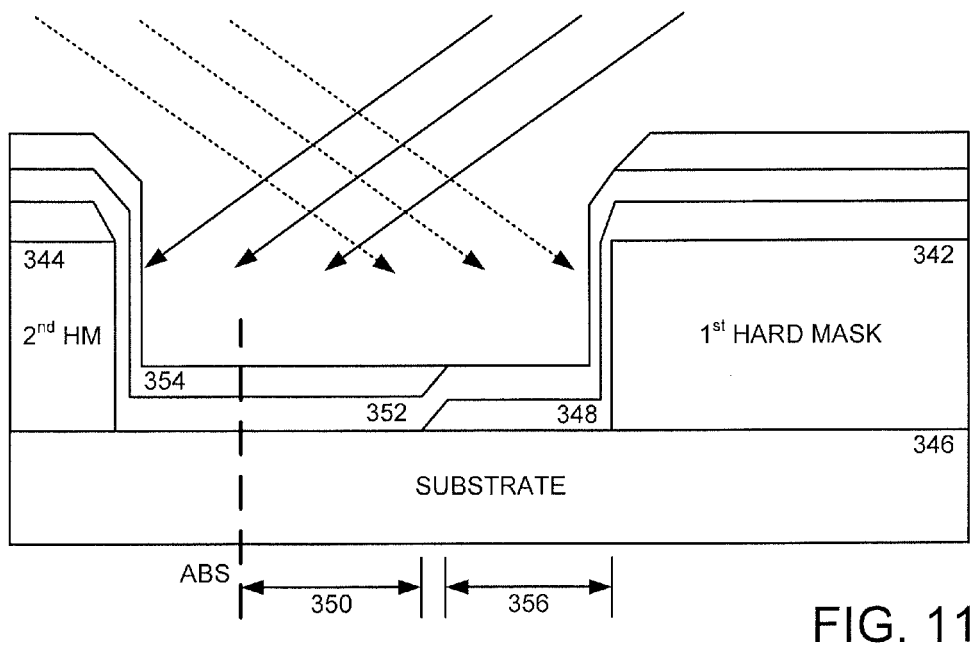
FIG. 11 displays an embodiment of a manufacturing technique that can be utilized during the manufacturing of the magnetic element of FIG. 10.

In some embodiments, oblique deposition of layers from opposite lateral sides can provide magnetic stack layers that are offset from both the ABS and the rear extent of the stack. FIG. 11 provides an embodiment of a manufacturing process used to create such dual offset distances. A first and second hard mask 342 and 344 are positioned on opposite sides of a predetermined ABS plane on a substrate 346. The opposing hard masks 342 and 344 allow incident deposition angles that cast "shadows" predetermined distances away from either the first hard mask 342 or the ABS.

As shown, a first stack layer 348 can be deposited that is offset from the ABS by a first distance 350 through oblique angle deposition originating from the opposite side of the ABS. That is, the offset distance 350 corresponds with the segmented deposition indicators, which originate above the second hard mask 344 and on the opposite side of the ABS from the deposited layer 348. For clarity, an intervening stack layer 352 separates the first stack layer 348 from a second stack layer 354, which is offset from the rear extent of the stack, which corresponds to the vertical leading edge of the first hard mask 342.

The solid deposition indicators illustrate how a shadow is cast by the first hard mask 342 and the second stack layer 354 is prevented from settling in the second offset distance 356. After final processing of the stack, including removal of excess material and the hard masks, the first stack layer 348 will not contact the ABS while the second stack layer 354 will not contact the rear extent of the stack, such as the insulation or hard magnet shown throughout the present disclosure.

With the ability to use oblique deposition to construct magnetic stack layers that can be offset from one, or both, lateral sides, precise magnetic stacks can be designed and manufactured in accordance with the various embodiments of the present disclosure, which include layers that extend less than the full stripe height of the magnetic stack.

Figure 12:
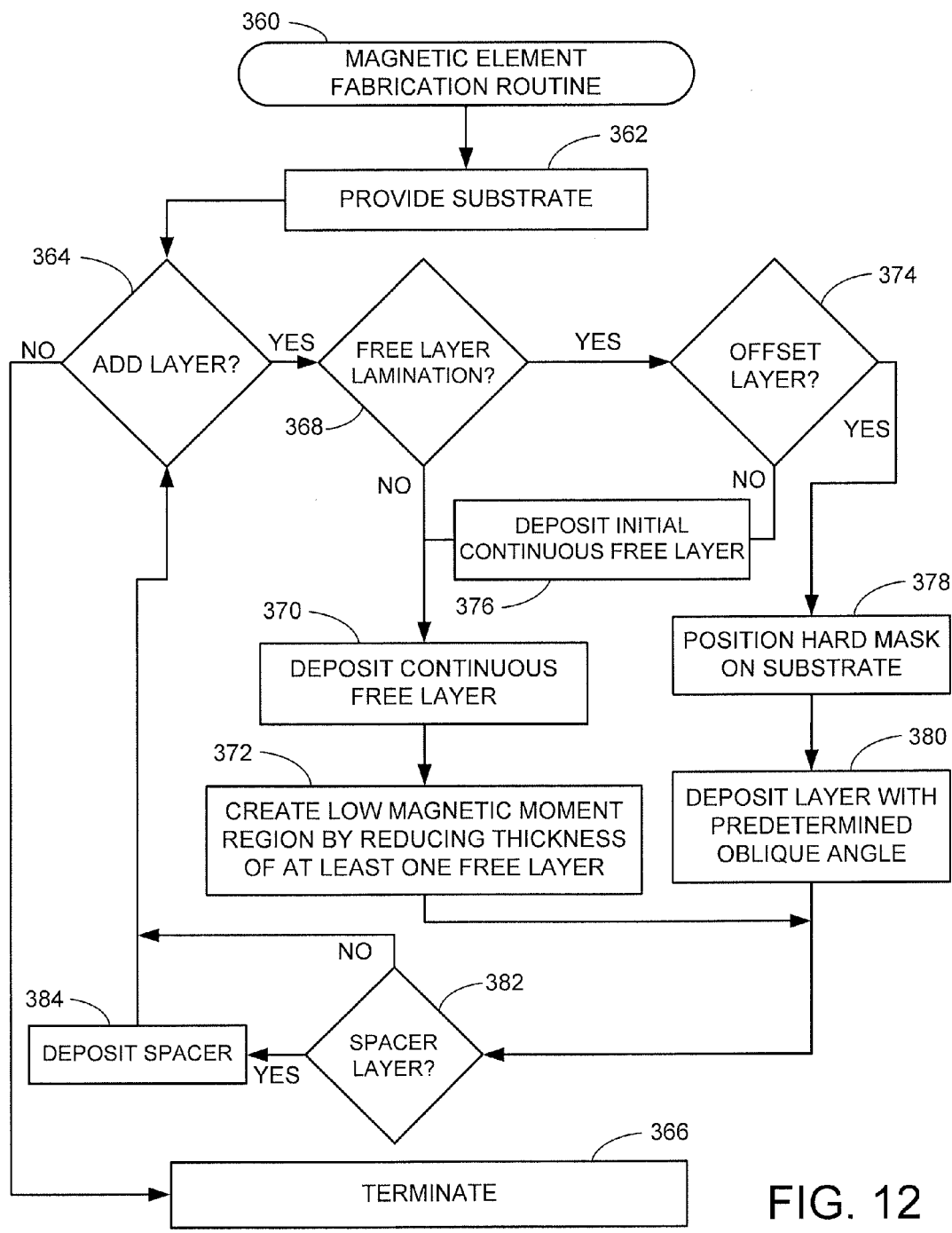
FIG. 12 provides a flow chart of a magnetic element fabrication routine performed in accordance with various embodiments of the present invention.

FIG. 12 provides a magnetic element fabrication routine 360 performed in accordance with various embodiments of the present invention. A substrate is initially provided in step 362, which can be a variety of different materials and sizes, such as the shield 150 of FIG. 2. A decision 364 is then made concerning if a layer is to be added to the substrate provided in step 362. If no layer is to be added, the routine 360 terminates at step 366 with merely the substrate, in whatever predetermined form, being constructed.

If adding a layer to the substrate is in order, decision 368 evaluates if the free layers are to be laminations or continuous single layers. A determination that no lamination is wanted leads to a deposition of a continuous ferromagnetic free layer in step 270, as discussed above. It should be noted that subsequent continuous free layers can have varying thicknesses, materials, and deposition angles, but will have a uniform stripe height, as measured normal to the ABS surface, that extends to a rear mounted hard magnet. The deposition of the continuous free layer in step 370 is followed by reducing the thickness of a portion of the free layer proximal to the hard magnet in step 372 to create a low magnetic moment region.

The low magnetic region generated by the reduction in thickness can be accomplished in a variety of manners, such as a taper, notch, and curvilinear transition, discussed above, but reiterated to illustrate the robust capability and non-limiting nature of routine 360. In relation to the generated low magnetic region from step 272, the thicker portion of the free layer proximal to the ABS has a high magnetic moment that will aid in magnetic stability and performance of the free layers.

However, a determination at decision 368 is to be a lamination leads to decision 374 where an offset orientation of the layer is evaluated. If no offset is chosen in step 374, step 376 deposits an initial continuous free layer that is then supplemented by the continuous free layer of step 270 to form a laminated free layer. The process continues to step 372 where some or the entire initially deposited free layer can be removed to form the low magnetic moment region.

An offset determination in decision 374 then proceeds to step 378 where a hard mask is positioned on the substrate, as in FIGS. 8 and 11, to shadow a predetermined portion of the substrate based an oblique incident angle of deposition. Step 380 then deposits the layer through the deposition process discussed above. With at least one layer deposited on the substrate, the routine 360 evaluates in decision 382 whether a spacer layer is to be constructed adjacent to the layer deposited in step 380. The construction of a non-magnetic spacer layer is fulfilled in step 384 with a deposition of the non-magnetic spacer with a predetermined thickness and a stripe height that extends from the ABS proximally to the rear hard magnet.

A decision for no spacer layer returns the routine 360 to decision 364 where a series of layers can be deposited with laminated and offset orientations. It can be appreciated that from routine 360 any of various magnetic stack embodiments discussed above can be constructed to accommodate a wide range of structural and operational characteristics revolving around establishing high and low magnetic moment regions. As such, the routine 360 is merely an example of a fabrication process which is not limited and in which the various decisions and steps can be modified, moved, or removed.

It can be appreciated that the configuration and material characteristics of the magnetic element described in the present disclosure allows for the creation of dual magnetic moment regions in a variety of manners. The coexistence of the different magnetic moment regions in a magnetic element provides enhanced stability through tuned balancing of the bias field emanating from a rear mounted hard magnet. The ability to reliably orient the bias field by conditioning a continuous free layer or with dissimilar saturation magnetization materials allows dual magnetic moment regions to be created that are precisely constructed for various applications.

It is to be understood that even though numerous characteristics and configurations of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising first and second ferromagnetic free layers separated by a non-magnetic spacer, a first ferromagnetic free layer configured as a lamination of first and second sub-layers respectively having different stripe heights measured from an air bearing surface (ABS) and different low and high magnetic moments regions, the first sub-layer positioned proximal the ABS and having a greater magnetic moment than the second sub-layer that continually extends from the ABS to proximal a bias magnet positioned distal the ABS, the low magnetic moment region of the first ferromagnetic free layer disposed between a non-magnetic spacer layer and the high magnetic moment region of the first ferromagnetic free layer, each ferromagnetic free layer biased to a default magnetization by a bias magnet positioned distal the ABS, a second ferromagnetic free layer continuously extending from the ABS to proximal the bias magnet distal the ABS.

2. The apparatus of claim 1, wherein the first sub-layer has a greater stripe height and lower magnetic moment than the second sub-layer.

3. The apparatus of claim 1, wherein the first and second sub-layers are different materials.

4. The apparatus of claim 1, wherein the first and second sub-layers are defined by an area of reduced thickness distal the ABS.

5. The apparatus of claim 1, wherein the first sub-layer has a first saturation magnetization and is contactingly adjacent the second sub-layer that has a second saturation magnetization.

6. The apparatus of claim 1, wherein the first and second sub-layers are different thicknesses of a common layer.

7. A magnetic storage device comprising first and second ferromagnetic free layer separated by a non-magnetic spacer, at least one ferromagnetic free layer configured as a lamination of first and second sub-layers respectively having different stripe heights measured from an air bearing surface (ABS) and different low and high magnetic moment regions, the first sub-layer positioned proximal the ABS and having a greater magnetic moment than the second sub-layer that continually extends from the ABS to proximal a bias magnet positioned distal the ABS, the low magnetic moment region of the at least one ferromagnetic free layer is disposed between the non-magnetic spacer layer and the high magnetic moment regions of the respective first and second ferromagnetic free layers, the bias magnet configured to bias each ferromagnetic free layer to a default magnetization.

8. The magnetic storage device of claim 7, wherein each of the ferromagnetic free layers are continuous along the ABS.

9. The magnetic storage device of claim 7, wherein the first and second ferromagnetic free layers are each configured as a lamination of first and second sub-layers.

10. The magnetic storage device of claim 7, wherein each ferromagnetic free layer comprises different and continuous first and second saturation magnetizations.

11. The magnetic storage device of claim 7, wherein an antiferromagnet (AFM) contacts both the first and second sub-layers, distal the ABS.

12. The magnetic storage device of claim 11, wherein the AFM has a pinning stripe height defined by the difference between the stripe heights of the first and second sub-layers.

13. The magnetic storage device of claim 11, wherein the AFM is positioned proximal the bias magnet.

14. The magnetic storage device of claim 7, wherein the first sub-layer and spacer have a common stripe height that is greater than a reduced stripe height of the second sub-layer.

15. The magnetic storage device of claim 7, wherein the first and second sub-layers have different thicknesses.

16. A method comprising:
separating first and second ferromagnetic free layers by a non-magnetic spacer; and
configuring at least one ferromagnetic free layers configured as a lamination of first and second sub-layers respectively having different stripe heights measured from an air bearing surface (ABS) and different low and high magnetic moments regions, the first sub-layer positioned proximal the ABS and having a greater magnetic moment than the second sub-layer that continually extends from the ABS to proximal a bias magnet positioned distal the ABS, the low magnetic moment region of the first ferromagnetic free layer disposed between a non-magnetic spacer layer and the high magnetic moment region of the first ferromagnetic free layer, each ferromagnetic free layer biased to a default magnetization by a bias magnet positioned distal the ABS.

17. The method of claim 16, wherein the first ferromagnetic free layer is deposited with an oblique incident angle that sets a magnetic anisotropy axis of at least one sub-layer to a predetermined orientation.

18. The method of claim 16, wherein at least one of the sub-layers is offset a predetermined distance from a hard mask.

19. The method of claim 16, wherein at least one of the sub-layers is offset a predetermined distance from the ABS.

20. The method of claim 16, wherein the first sub-layer has a first thickness and stripe height deposited with a first angle of deposition and the second sub-layer has a second thickness and stripe height deposited with a second angle of deposition, different from the first angle of deposition.

* * * * *